United States Patent
Miyatake et al.

[11] Patent Number: 6,153,694
[45] Date of Patent: Nov. 28, 2000

[54] GRAFT COPOLYMER PARTICLES AND THERMOPLASTIC RESIN COMPOSITIONS

[75] Inventors: Nobuo Miyatake; Kazunori Takikawa; Daisuke Nakamori, all of Takasago; Shigeki Hamaguchi, Takarazuka; Hideki Hosoi, Kobe, all of Japan

[73] Assignee: Kaneka Corporation, Osaka, Japan

[21] Appl. No.: 09/269,331

[22] PCT Filed: Jul. 24, 1998

[86] PCT No.: PCT/JP98/03304

§ 371 Date: Mar. 25, 1999

§ 102(e) Date: Mar. 25, 1999

[87] PCT Pub. No.: WO99/06457

PCT Pub. Date: Feb. 11, 1999

[30] Foreign Application Priority Data

Jul. 29, 1997 [JP] Japan ..................................... 9-203139

[51] Int. Cl.$^7$ .................................................. C08G 63/91
[52] U.S. Cl. ........................... 525/63; 525/100; 525/101; 525/105
[58] Field of Search .............................. 525/63, 101, 105, 525/100

[56] References Cited

U.S. PATENT DOCUMENTS 5,200,465  4/1993  Hellstern .................................... 525/66
5,336,720  8/1994  Richards .................................... 525/78

FOREIGN PATENT DOCUMENTS 5-25227   2/1993  Japan .
9-217006  8/1997  Japan .

*Primary Examiner*—Rachel Gorr
*Attorney, Agent, or Firm*—Armstrong, Westerman, Hattori, McLeland & Naughton

[57] ABSTRACT

There is provided graft copolymer particles prepared by graft-polymerizing a vinyl monomer to a coagglomerated rubber, wherein said rubber is prepared by coagglomerating rubber particles of mixed latexes obtained by mixing (A) a silicone rubber latex with (B) an acrylic rubber latex and/or a conjugated diene rubber latex in such an amount as a silicone content is from 1 to 90% by weight based on the total rubber component. A physical property of a thermoplastic resin is improved using the graft copolymer particles. The thermoplastic resin composition using the graft copolymer particles is excellent in impact resistance, weather resistance, processability, thermal discoloration resistance and appearance of molded products.

8 Claims, No Drawings

GRAFT COPOLYMER PARTICLES AND THERMOPLASTIC RESIN COMPOSITIONS

TECHNICAL FIELD

The present invention relates to graft copolymer particles which are prepared by using a coagglomerated rubber containing a silicone rubber, and a thermoplastic resin composition excellent in impact resistance, weather resistance, processability, thermal discoloration resistance and appearance of molded products.

BACKGROUND OF ART

Enhancement of impact resistance of a thermoplastic resin composition has been hitherto made widely by blending particles of a graft copolymer containing a rubber component with the thermoplastic resin.

As the rubber component, it is said that the use of a rubber component having glass transition temperature (Tg) of as low as possible is advantageous for exhibiting an impact resistance. In fact, a thermoplastic resin composition incorporated with a graft copolymer containing a polybutadiene rubber component having a low Tg of about −80° C., for example, acrylonitrile/butadiene/styrene copolymer (ABS resin), is more excellent in impact resistance than a thermoplastic resin composition incorporated with a poly(butyl acrylate) rubber component having a Tg of about −50° C.

In viewpoint of low Tg of rubber, Tg of a polyorganosiloxane (hereinafter also referred to as "silicone") rubber, for example, a polydimethylsiloxane rubber, is about −120° C. and therefore it is expected to exhibit higher impact resistance, if graft copolymer particles containing a silicone rubber component can be employed, compared to those containing a polybutadiene rubber component.

Also, a silicone rubber is advantageous since a silicone rubber is more excellent in weather resistance than a poly (butyl acrylate) rubber and a polybutadiene rubber.

In view of these matter, recently it has been widely investigated to employ graft copolymer particles prepared from a silicone rubber or a composite rubber containing a silicone rubber.

For example, Japanese Unexamined Patent Publication No. 100812/1992 discloses the use of graft copolymer particles which are prepared by graft-polymerizing a vinyl monomer to a composite rubber having such a structure that a silicone rubber component and a poly(alkyl(meth)acrylate) rubber component are entangled so as not to be separated from each other.

Japanese Unexamined Patent Publication No. 239015/1992 discloses the use of graft copolymer particles which are prepared by graft-polymerizing a vinyl monomer to a composite rubber having such a structure that a silicone rubber component and a conjugated butadiene rubber component are entangled so as not to be separated from each other.

However, even in the case that graft copolymer particles containing the above-mentioned composite rubber is employed as an impact modifier, the effect for improving impact resistance of thermoplastic resins is still unsatisfactory, and a problem is to develop an impact modifier for exhibiting higher impact resistance especially at low temperature. Additionally, another problem is that a method for preparing the above-mentioned composite rubber requires a long time to obtain some kinds of composite rubbers having different silicone rubber content and is inferior in productivity.

DISCLOSURE OF INVENTION

It has been found that novel graft copolymer particles containing silicone rubber can be prepared and graft copolymer particles having varied silicone rubber contents can be easily prepared, by graft-polymerizing a vinyl monomer onto a coagglomerated rubber of enhanced particle size which is prepared by coagglomerating a mixed latex obtained by mixing a silicone rubber latex having a low Tg and excellent in mold releasing property with an acrylic rubber latex and/or a conjugated diene rubber latex, and that a thermoplastic resin composition wherein the above-mentioned graft copolymer particles are incorporated into a thermoplastic resin is not only extremely excellent in impact resistance but also excellent in weather resistance, processability, appearance of molded products.

Namely, the present invention relates to (1) Graft copolymer particles prepared by graft-polymerizing a vinyl monomer to a coagglomerated rubber of enhanced particle size, wherein said rubber of enhanced particle size is prepared to enhance particle size by coagglomerating rubber particles of a mixed latex obtained by mixing (A) a silicone rubber latex with (B) at least one latex selected from the group of an acrylic rubber latex and a conjugated diene rubber latex in such an amount that a silicone content is from 1 to 90% by weight (hereinafter referred to as "%") based on the total rubber component, (2) the graft copolymer particles of the above(1) wherein said coagglomerated rubber of enhanced particle size is prepared by adding from 0.1 to 15 parts by weight (hereinafter referred to as "parts") of a latex of a copolymer having an acid functional group (solid basis) to 100 parts of said mixed latex (solid basis), thereby coagglomerating said mixed latex, in which said latex of a copolymer having an acid functional group is prepared by copolymerizing from 1 to 30% of an unsaturated acid monomer, from 35 to 99% of a (meth) acrylate monomer and from 0 to 35% of another monomer copolymerizable thereto, (3) the graft copolymer particles of the above(1), wherein said silicone latex (A) is at least one rubber latex selected from the group consisting of a silicone rubber latex and a latex of a composite rubber comprising a silicone rubber and an acrylic rubber, (4) the graft copolymer particles of the above (1), (2) or (3), wherein said vinyl monomer is at least one monomer selected from the group consisting of an aromatic vinyl monomer, a vinyl cyanide monomer, a vinyl halide monomer, a (meth)acrylic acid monomer and a (meth)acrylate monomer, (5) a thermoplastic resin composition comprising 1 to 150 parts of said graft copolymer particles of the above(1), (2),(3) or (4) and 100 parts of a thermoplastic resin, and (6) the thermoplastic resin composition of claim 5, wherein said thermoplastic resin is at least one resin selected from the group consisting of poly(vinyl chloride), polystyrene, styrene-acrylonitrile copolymer, styrene-acrylonitrile-N-phenylmaleimide copolymer, α-methylstyrene-acrylonitrile copolymer, poly(methyl methacrylate), methyl methacrylate-styrene copolymer, polycarbonate, polyamide, polyester, ABS resin, AAS resin, AES resin and poly(phenylene ether)-polystyrene composite resin.

BEST MODE FOR CARRYING OUT THE INVENTION

The graft copolymer particles of the present invention are graft copolymer particles prepared by graft-polymerizing a vinyl monomer to a coagglomerated rubber which is prepared by coagglomerating mixed latex obtained by mixing (A) a silicone rubber latex with (B) an acrylic rubber latex and/or a conjugated diene rubber latex.

The silicone rubber contained in the above-mentioned coagglomerated rubber is a component employed to facilitate interfacial peeling off by incorporating a silicone rubber excellent in mold releasing property into the coagglomerated rubber and, on the other hand, the acrylic rubber and/or the conjugated diene rubber is a component employed to provide a silicone rubber with an interface with a different kind of a rubber.

The vinyl monomer graft-copolymerized to the above-mentioned coagglomerated rubber is a component employed, in the case of incorporating graft copolymer particles with a thermoplastic resin, to enhance compatibility of the graft copolymer particles with the thermoplastic resin and to uniformly disperse the graft copolymer particles into the thermoplastic resin.

Recently, it has been considered that a rubber component advantageous for improving impact resistance of a thermoplastic resin has not only a low Tg but also a capability of quickly relaxing a stress concentrated, when receiving an impact, in the rubber particles by producing voids in the rubber. Accordingly, it is considered that a coagglomerated rubber containing silicone rubber particles which is excellent in mold releasing property reveals an excellent impact resistance based on that the coagglomerated rubber relaxes the stress concentrated, when receiving an impact, in rubber particles by formation of voids resulting from interfacial peeling off between the silicone rubber particles and the other rubber particles. Therefore, the characteristic of the present invention of revealing high impact resistance cannot be obtained in the case of using graft copolymer particles only using a rubber prepared by agglomerating only an acrylic rubber latex and/or a conjugated diene rubber latex (B), namely, an agglomerated rubber prepared from acrylic rubber particles, an agglomerated rubber prepared from conjugated diene rubber particles or a coagglomerated rubber prepared from acrylic rubber particles and a conjugated diene rubber particles.

The silicone rubber in the present invention includes a polyorganosiloxane having rubber elasticity i.e., a conventional silicone rubber, a composite rubber wherein the silicone rubber and an organic rubber containing no silicone segment (for example, an acrylic rubber, a butadiene rubber etc.) are chemically bonded, a composite rubber wherein the silicone rubber and an organic rubber containing no silicone segment are entangled with each other, an organic rubber containing a silicone segment, and the like.

The above-mentioned silicone rubber latex (A) employed in the present invention encompasses not only a silicone rubber latex, but also a latex of a composite rubber comprising a silicone rubber and another rubber such as an acrylic rubber or a conjugated diene rubber. Any latex of a rubber can be employed without particular limitation as long as it has an expectation of reducing impact, when receiving impact, by producing voids resulting from interfacial peeling of a silicone rubber contained in a coagglomerated rubber. Among those, a silicone rubber latex and a latex of a composite rubber comprising a silicone rubber and an acrylic rubber are preferable from the viewpoint of easy preparation.

The term "acrylic" in the above-mentioned acrylic rubber means that the content of units derived from a (meth)acrylic monomer in the rubber is at least 50%, particularly at least 0%.

The term "conjugated diene" in the above-mentioned conjugated diene rubber means that the content of units derived from a conjugated diene monomer in the rubber is at least 50%, particularly at least 60%, same as the term "acrylic".

The average particle size of the silicone rubber particles contained in the above-mentioned silicone rubber latex (A) is preferably from 20 to 200 nm, particularly from 20 to 150 nm, from the viewpoint that it is easy to coagglomerate the particles and the other rubber particles according to the coagglomeration process as described later.

The content of an insoluble portion in a solvent in the above-mentioned silicone rubber particles (gel content: weight percentage of an insoluble portion in toluene which is measured by immersing a sample in toluene at room temperature for 24 hours and then by centrifuging at 12000 rpm for one hour) is from 0 to 100%. Preferably it is from 0 to 40% or from 60 to 100% from the viewpoint of revealing impact resistance.

The content of a silicone component in the above-mentioned silicone rubber particles is not particularly limited as long as the silicone content in an obtainable coagglomerated rubber is within a predetermined content range. The content is preferably at least 50%, particularly at least 60% from the viewpoint of revealing impact resistance. The upper limit thereof is 100%.

Examples of the above-mentioned silicone rubber are, for example, a dimethylsiloxane rubber, a composite rubber having a chemical bond between a butyl acrylate rubber and a dimethylsiloxane rubber, a composite rubber wherein a butyl acrylate rubber and a dimethylsiloxane rubber are entangled with each other, a composite rubber having a chemical bond between a butadiene rubber and a dimethylsiloxane rubber, a composite rubber wherein a butadiene rubber and a dimethylsiloxane rubber are entangled with each other, and the like. Among those, a dimethylsiloxane rubber and a composite rubber comprising a butyl acrylate rubber and a dimethylsiloxane rubber are preferable from the viewpoint of good weather resistance and easy preparation.

The concentration of solid component (measured after drying at 120° C. for 1 hour) of the silicone rubber latex (A) is usually from 10 to 50%, preferably from 20 to 40%, from the viewpoint that it is easy to control the particle diameter in the coagglomeration process as described later. Further, the pH of the latex is preferably from 5 to 11, particularly from 6 to 10.

The silicone rubber latex (A) can be prepared by polymerizing, for example, an organosiloxane, and, if necessary, a crosslinking agent, a graft-linking agent and other organosilanes by a known method (for example, methods described in U.S. Pat. Nos. 2,891,920 and 3,294,725).

The above-mentioned organosiloxane is a component composing the main structure of the silicone rubber chain, and those having a straight chain or a cyclic chain can be employed. Among those, a cyclic organosiloxane is often employed from the viewpoint of applicability to an emulsion polymerization system and from economical point of view. Examples of the cyclic organosiloxane are, for example, those having six- to twelve-membered ring such as hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, octaphenylcyclotetrasiloxane and the like.

These may be employed solely or in combination of two or more thereof. Among those, those having phenyl group are employed to control revealing of impact resistance by giving compatibility with the component (B).

The above-mentioned crosslinking agent is a component to introduce a crosslinking structure into the silicone rubber by being copolymerized with the organosiloxane in order to reveal a rubber elasticity. Examples thereof are, for example, a three- or four-functional silane compound such as tetramethoxysilane, tetraethoxysilane, triethoxymethylsilane, triethoxyethylsilane, butyltrimethoxysilane, propyltrimethoxysilane or octyltrimethoxysilane. These may be employed solely or in combination of two or more thereof. Among those, the silane compounds having a monovalent hydrocarbon group of 2 to 8 carbon atoms are employed to impart a compatibility with the component (B) to thereby control revealation of impact resistance.

The above-mentioned graft-linking agent is a reactive silane compound having a polymerizable unsaturated bond or mercapto group in its molecule, an organosiloxane having a polymerizable unsaturated bond or mercapto group in its molecule, or the like, and this agent is a component to introduce a polymerizable unsaturated bond or mercapto group into a side chain and/or an end of a copolymer by copolymerizing it with the above-mentioned organosiloxane, the above-mentioned crosslinking agent, etc. The polymerizable unsaturated bond or the mercapto group serves as an active site to graft a vinyl monomer which is graft-copolymerized to the coagglomerated rubber employed in the present invention. The polymerizable unsaturated bond or the mercapto group also serves as a cross-linking site in the case of carrying out a radical reaction using a radical polymerization initiator. Even in the case of cross-linking by radical reaction, graft-copolymerization can be carried out because a part of those remains as an active site for grafting.

Examples of the above-mentioned reactive silane compound having a polymerizable unsaturated bond in its molecule are, for example, a reactive silane compound represented by the formula (1):

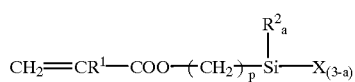

(1)

wherein $R^1$ is hydrogen atom or methyl group, $R^2$ is a monovalent hydrocarbon group having 1 to 6 carbon atoms, X is an alkoxy group having 1 to 6 carbon atoms, a is 0, 1 or 2, p is an integer of 1 to 6; a reactive silane compound represented by the formula (2):

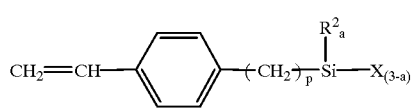

(2)

wherein $R^2$, X, a and p are the same as defined in the formula (1) ; a reactive silicone compound represented by the formula (3):

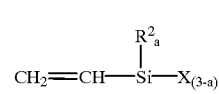

(3)

wherein $R^2$, X and a are the same as defined in the formula (1) a reactive silane compound represented by the formula (4):

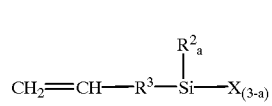

(4)

wherein $R^2$, X and a are the same as defined in the formula (1) and $R^3$ is a divalent hydrocarbon group having 1 to 6 carbon atoms; and the like.

Examples of $R^2$ in the formulas (1) to (4) are, for example, an alkyl group having 1 to 6 carbon atoms such as methyl group, ethyl group or propyl group, phenyl group and the like. Examples of X are, for example, an alkoxy group having 1 to 6 carbon atoms such as methoxy group, ethoxy group, propoxy group or butoxy group, and the like. Examples of $R^3$ in the formula (4) are an alkylene group having 1 to 6 carbon atoms such as methylene group, ethylene group, trimethylene group, propylene group or tetramethylene group, and the like.

Examples of the reactive silane compound represented by the formula (1) are, for example, β-methacryloyloxyethyldimethoxymethylsilane, γ-methacryloyloxypropyldimethoxymethylsilane, γ-methacryloyloxypropyltrimethoxysilane, γ-methacryloyloxypropyldimethylmethoxysilane, γ-methacryloyloxypropyltriethoxysilane, γ-methacryloyloxypropyldiethoxymethylsilane, γ-methacryloyloxypropyltripropoxysilane, γ-methacryloyloxypropyldipropoxymethylsilane and the like. Examples of the reactive silane compound represented by the formula (2) are, for example, p-vinylphenyldimethoxymethylsilane, p-vinylphenyltrimethoxysilane, p-vinylphenyltriethoxysilane, p-vinylphenyldiethoxymethylsilane and the like. Examples of the reactive silane compound represented by the formula (3) are, for example, vinylmethyldimethoxysilane, vinylmethyldiethoxysilane, vinyltrimethoxysilane, vinyltriethoxysilane and the like. Examples of the reactive silane compound represented by the formula (4) are, for example, allylmethyldimethoxysialne allylmethyldiethoxysilane, allyltrimethoxysilane, allyltriethoxysilane and the like. Among those, the monomers represented by the formulas (1) and (2) are preferably employed from the viewpoint of economical efficiency and reactivity.

Examples of the reactive silane compound having mercapto group in its molecule are, for example, a reactive silane compound represented by the formula (5):

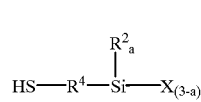

(5)

wherein $R^2$, a and X are the same as defined above and $R^4$ is a divalent organic group such as an alkylene group having 1 to 18 carbon atoms, and the like. Examples of the alkylene group are, for example, methylene group, ethylene group, trimethylene group, propylene group, tetramethylene group and the like.

Examples of the reactive silane compound represented by the formula (5) are, for example, mercaptopropyltrimethoxysilane, mercaptopropyldimethoxymethylsilane and the like.

In addition, as a graft-linking agent, there can be also employed a cyclic siloxane having an unsaturated bond or mercapto group in its molecule, for example, tetravinyl tetramethylcyclotetrasiloxane, tetramethacryloyloxypropyltetramethylcyclotetrasiloxane, tetramercaptopropyltetramethylcyclotetrasiloxane and the like.

When the reactive silane compound is trialkoxysilane type, it can be employed as a graft-linking agent and a crosslinking agent.

The organosilanes other than the above-mentioned cross linking agent and the above-mentioned graft-linking agent are employed to give an affinity with the component (B), and an example thereof is an organosilane having a structural unit represented by the formula (6):

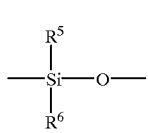

(6)

wherein $R^5$ and $R^6$ are a monovalent hydrocarbon group having 1 to 10 carbon atoms such as methyl group, ethyl group, propyl group or phenyl group, and $R^5$ and $R^6$ may be the same or different as long as both $R^5$ and $R^6$ are not methyl group at the same time. Examples of the organosilane having a structural unit represented by the formula (6) are, for example, methylbutyldimethoxysilane, dibutyldimethoxysilane, methyloctyldimethoxysilane, phenylmethyldimethoxysilane, diphenyldimethoxysilane, butyltrimethoxysilane, propyltrimethoxysilane, octyltrimethoxysilane and the like. These may be employed solely or in combination of two or more thereof. If the organosilane having a structural unit represented by the formula (6) is employed as an organosilane, a crosslinking agent and a graft-linking agent, there is no need to employ this organosilane.

The amounts of the organosiloxane, the crosslinking agent, the graft-linking agent and the other organosilane are selected so that the contents thereof in the silicone rubber of the latex (A) are usually from 70 to 99.9%, preferably from 85 to 99.5%, for the organosiloxane, from 0 to 10%, preferably 0 to 5%, for the crosslinking agent, from 0 to 10%, preferably from 0.3 to 5%, for the graft-linking agent, and from 0 to 10%, preferably from 0 to 5%, for the other organosilane, and the sum of them being 100%. The content of the crosslinking agent and the content of graft-linking agent are not 0% at the same time, and either one thereof is preferably at least 0.1%.

If the content of the organosiloxane units is too small, property as a rubber is not revealed and the effect of revealing impact resistance tends to lower. On the other hand, if the content of the organosiloxane units is too large, the contents of the crosslinking agent, the graft-linking agent and the other organosilane are so small that it tends to become hard to exhibit the effects to be produced by the use thereof. And if the content of the crosslinking agent or the graft-linking agent is too small, the effect of revealing impact resistance tends to lower. If the content is too large, property as a rubber is not revealed and the effect of revealing impact resistance tends to lower. The other organosilane is an optional component and can control the effect of revealing impact resistance by giving an affinity with the compound (B) whereas it is preferable to employ this compound in consideration of cost and a balance of physical property since the use of the organosilane causes higher cost.

The above-mentioned silicone rubber latex can be prepared according to, for example, a method wherein a mixture of an organosiloxane and, if necessary, a crosslinking agent, a graft-linking agent and another organosilane is emulsified to disperse into water in the presence of an emulsifier by mechanical shear and the polymerization is carried out in an acidic condition. In this case, when emulsified liquid droplets of at least several micrometers have been prepared by the mechanical shear, the average particle diameter of silicone rubber particles obtained after the polymerization can be controlled within the range of 20 to 400 nm by the amount of an emulsifier employed. When preparing emulsified liquid droplets of 200 to 50 nm by the mechanical shear, the particle diameter of silicone rubber obtained after the polymerization is as large as that of the emulsion droplets. The latter method is not preferable in the present invention since a silicone rubber having an average particle diameter of more than 200 nm is difficult to coagglomerate the silicone rubber particles and the other rubber particles according to the coagglomeration process as described later.

In case of preparing a silicone rubber having an average particle diameter of at most 100 nm, the polymerization is preferably carried out in multi-stage. For example, an emulsion the liquid droplets of which have a size of at least several micrometers is prepared by emulsifying a mixture of an organosiloxane and, if necessary, a crosslinking agent, a graft-linking agent and another organosilane, water and an emulsifier by mechanical shear, and 1 to 50% of the obtained emulsion is precedingly emulsion-polymerized in an acidic condition and the rest of the emulsion is added to continue the polymerization in the presence of the obtained silicone rubber. Thus obtained silicone rubber has an average particle diameter of at most 100 nm and a standard deviation of particle 10 diameter distribution of at most 50.

The above-mentioned emulsified liquid droplets having a diameter of at least several micrometer can be prepared by the use of a high-speed stirrer such as a homomixer. The emulsified liquid droplets having a diameter of from 200 to 500 nm can be prepared by the use of a special dispersing machine such as a high-pressure homogenizer or a ultrasonic dispersing machine.

The emulsifiers employed in these methods should be those which do not lose activity as the emulsifier even when employed in an acid range. Examples of such an emulsifier are, for example, alkylbenzenesulfonic acid, sodium alkylbenzenesulfonate, alkylsulfonic acid, sodium alkylsulfonate, sodium (di)alkylsulfosuccinate, sodium polyoxyethylenenonylphenylether sulfonate, sodium alkyl sulfate and the like. These may be employed solely or in combination of two or more thereof.

As to the acidic condition, preferably the pH is controlled within the range of from 1.0 to 3.0 by adding, to the system, an inorganic acid such as sulfonic acid or hydrochloric acid, or an organic acid such as alkylbenzenesulfonic acid, alkylsulfonic acid or trifluoroacetic acid.

The polymerization temperature for preparing a silicone rubber latex is preferably from 60 to 120° C., particularly 70 to 100° C., from the viewpoint of suitable rate of polymerization.

Thus the silicone rubber latex is obtained, but the latex is preferably neutralized by adding an aqueous solution of an alkali such as sodium hydroxide, potassium hydroxide or sodium carbonate in order to stabilize the silicone rubber chain, since Si—O—Si bond composing the silicone rubber backbone is under equilibrium between cleavage and formation of the bond in acidic condition, which equilibium varies depending on temperature. In order to obtain the silicone rubber having a high molecular weight and a high degree of crosslinking, preferably the latex is neutralized after the polymerization to prepare the silicone rubber latex is carried out at a temperature of at least 60° C. and then the obtained latex is cooled to about room temperature and maintained for about 5 to about 100 hours, since the above-mentioned equilibrium shifts to the formation of Si—O—Si bond at a lower temperature, so that it becomes easier to produce the silicone rubber having a high molecular weight and a high degree of crosslinking.

Examples of the latex of a composite rubber containing a silicone rubber and an acrylic rubber as a rubber component are, for example, a composite rubber latex which is prepared by seed-polymerizing a monomer mixture employed for preparing an acrylic rubber latex described later in the presence of the above-mentioned silicone rubber latex, a composite rubber latex which is prepared by adding the above-mentioned components employed for preparing the silicone rubber latex as they are or in an emulsion form to an acrylic rubber latex described later and subjecting to the polymerization in the presence of the acrylic rubber latex.

Detailed explanations of the above-mentioned monomer mixture employed for preparing the acrylic rubber later and the above-mentioned acrylic rubber latex are omitted here and described later.

The method for preparing a latex of a composite rubber containing a silicone rubber and an acrylic rubber as a rubber component is not particularly limited, and, for example, a known method of seed emulsion polymerization is preferably employed. Either of an acrylic rubber latex and a silicone rubber latex can be employed as a component of seed. It is preferable to add a mixture of the above-mentioned organosiloxane and the cross-linking agent etc., as it is or in an emulsion form, to an acrylic rubber latex as a seed, from the viewpoints of that it is easy to control the particle diameter of resulting latex and that a narrow distribution of particle diameter is given.

In the case of preparing a composite rubber wherein an acrylic rubber and a silicone rubber are well compatible based on a chemical bond formed between the acrylic rubber and the silicone rubber when polymerizing an organosiloxane etc., because of an acrylic rubber having a reactive silyl group, from the viewpoint of being advantageous for revealing impact resistance, when preparing the acrylic rubber latex, it is preferable to copolymerize a reactive silane compound having a polymerizable unsaturated bond such as the above-mentioned graft-linking agent.

In the case of using a latex of a composite rubber containing a silicone rubber and a conjugated diene rubber as a rubber component, the composite rubber can be prepared by using a conjugated diene rubber latex or a monomer mixture for preparing the conjugated diene rubber latex, instead of the monomer mixture for preparing an acrylic rubber latex or the acrylic rubber latex in the above-mentioned composite rubber latex containing a silicone rubber and an acrylic rubber as a rubber component.

The acrylic rubber latex and/or conjugated rubber latex (B) employed in the present invention is a rubber latex having a (meth)acrylic monomer unit content of at least 50% and/or a rubber latex having conjugated diene monomer unit content of at least 50%, as described above. Latexes of those having property as a rubber can be employed without particular limitation.

The average particle diameter of rubber particles contained in the acrylic rubber latex and/or conjugated diene rubber latex (B) is preferably from 20 to 200 nm, particularly from 20 to 150 nm, from the viewpoint that it is easy to coagglomerate the rubber particles and the silicone rubber particles according to the coagglomeration process as described later.

The content of a solvent-insoluble portion in the rubber particles of the acrylic rubber latex and/or conjugated diene rubber latex (B) (gel content: weight percentage of an insoluble portion in toluene, which is measured by immersing a sample in toluene at room temperature for 24 hours and then by centrifuging at 12000 rpm for one hour) is preferably at least 70%, particularly at least 80%, from the viewpoint of revealing impact resistance. The upper limit thereof is 100%.

Examples of the above-mentioned acrylic rubber are, for example, a butyl acrylate polymer rubber, a butyl acrylate-2-ethylhexyl (meth)acrylate copolymer rubber, a butyl acrylate-butadiene copolymer rubber, a butyl acrylate-styrene copolymer rubber and the like. Examples of the above-mentioned conjugated diene rubber are, for example, a butadiene polymer rubber, an acrylonitrile-butadiene copolymer rubber, a styrene-butadiene copolymer rubber, and the like. These may be employed solely or in combination of two or more thereof. The copolymer mentioned here includes a random copolymer, a block copolymer, a graft copolymer, and may be a copolymer combining these copolymers.

The concentration of solid component (measured after drying at 120° C. for 1 hour) of the acrylic rubber latex and/or conjugated diene rubber latex (B) is usually from 10 to 50%, preferably from 20 to 40%, from the viewpoint that it is easy to control a particle diameter in a coagglomeration process as described later. Further, the pH of the latex is preferably from 5 to 11, particularly from 6 to 10.

The acrylic rubber latex employed as the component (B) can be prepared by polymerizing a monomer mixture containing an alkyl (meth)acrylate monomer, a poly-functional monomer having at least two polymerizable unsaturated bonds in its molecule, the other polymerizable monomer and the like, using a radical polymerization initiator and, if necessary, a chain transfer agent, according to a conventional method of emulsion polymerization (for example, methods described in Japanese Unexamined Patent Publication Nos. 88169/1975and 141746/1986, etc.).

The above-mentioned alkyl (meth)acrylate monomer is a component for forming a main structure of the acrylic rubber. Examples thereof are an alkyl acrylate having an alkyl group of 1 to 12 carbon atoms such as methyl acrylate, ethyl acrylate, propyl acrylate, butyl acrylate or 2-ethylhexyl acrylate, an alkyl methacrylate having an alkyl group of 4 to 12 carbon atoms such as 2-ethylhexyl methacrylate or lauryl methacrylate. These monomers may be employed solely or in combination of two or more thereof. A monomer containing from 40 to 100%, particularly from 60 to 100%, of butyl acrylate is preferable from the viewpoints of a low glass transition temperature of a resulting polymer and economical efficiency, wherein the other acrylic monomers to be employed with butyl acrylates are, for example, methyl acrylate, ethyl acrylate, 2-ethylhexyl acrylate and the like.

The above-mentioned poly-functional monomer having at least two polymerizable unsaturated bonds in its molecule is a component employed for giving a rubber elasticity by introducing a crosslinking structure to the acrylic rubber particles and to form a network structure and, in addition, employed for providing an active site to graft a vinyl monomer to be graft-polymerized onto a coagglomerated rubber. Examples thereof are diallyl phthalate, triallyl cyanurate, triallyl isocyanurate, allyl methacrylate, ethylene glycol dimethacrylate, divinylbenzene and the like. These may be employed solely or in combination of two or more thereof. Among those, allyl methacrylate, triallyl cyanurate and triallyl isocyanurate are preferable from the viewpoints of crosslinking and grafting efficiencies.

The above-mentioned other copolymerizable monomer is a monomer for controlling a refractive index of resulting acrylic rubber and an affinity with a silicone rubber. Examples thereof are, for example, methacrylic acid; a methacrylate monomer such as methyl methacrylate, ethyl methacrylate, gricidyl methacrylate, hydroxyethyl methacrylate or benzyl methacrylate; an aromatic vinyl monomer such as styrene or α-methylstyrene; a vinyl cyanide monomer such as acrylonitrile or methacrylonitrile; a vinyl monomer containing silicon such as γ-methacryloyloxypropyldimethoxymethylsilane, γ-methacryloyloxypropyltrimehoxysilane or trimethylvinylsilane; and the like. These may be employed solely or in combination of two or more thereof.

The preferable amount of the monomers in the preparation of the above-mentioned acrylic rubber latex is from 66.5 to 99.9%, particularly from 85 to 99.9%, of the alkyl (meth)acrylate monomer, from 0.1 to 10%, particularly from 0.1 to 5%, of the poly-functional monomer having at least two polymerizable unsaturated bonds in its molecule and from 0 to 20%, particularly from 0 to 10% of the other copolymerizable monomer, and the sum of them is 100%. If the amount of the above-mentioned alkyl (meth)acrylate monomer is too small, property as a rubber is not revealed and the effect of revealing impact resistance tends to lower. On the other hand, if the amount of the alkyl (meth)acrylate monomer is too large, the amount of the poly-functional monomer having at least two polymerizable unsaturated bonds in its molecule is so small that there occurs a tendency that the enough effects by using this compound are not exhibited. If the amount of the poly-functional monomer having at least two polymerizable unsaturated bonds in its molecule is too small, the density of crosslinking is so small that the effect of revealing impact resistance tends to lower. If the amount is too large, the density of crosslinking is so large that the effect of giving impact resistance tends to lower. The other copolymerizable monomer is a component employed for controlling refractive index and impact resistance, and preferably at least 0.1% of the monomer is employed in order to obtain the effects produced thereby.

The conjugated diene rubber latex employed as the component (B) can be prepared by polymerizing a conjugated diene and other copolymerizable monomer, using a radical polymerization initiator and, if necessary, a chain transfer agent, according to a conventional emulsion polymerization method.

The above-mentioned conjugated diene is a component for forming a main structure of conjugated diene rubber. Examples thereof are 1,3-butadiene, isoprene, chloroprene and the like. These may be employed solely or in combination of two or more thereof. Among those, 1,3-butadiene is preferable from the viewpoint that Tg of a resulting rubber therefrom is low enough.

The above-mentioned other copolymerizable monomer is a component employed for controlling a refractive index of the rubber and an affinity with another rubber component. Examples thereof are a vinyl cyanide monomer such as acrylonitrile or methacrylonitrile, an aromatic vinyl monomer such as styrene, α-ethylstyrene or p-methylstyrene, and the like. These may be employed solely or in combination of two or more thereof.

The amount of the monomers in the preparation of the above-mentioned conjugated diene rubber latex is preferably at least 50%, particularly at least 60% and at most 100% of the conjugated diene, and at most 50%, particularly at most 40% and at least 0% of the other polymerizable monomer. If the amount of the above-mentioned conjugated diene is too small, property as a rubber is not revealed and the effect of revealing impact resistance becomes low. The above-mentioned other polymerizable monomer is an optional component and therefore it is not always employed. However, it is preferable to employ at least 0.1% of other polymerizable monomer in order to achieve an object of using it since the monomer is an component used for controlling a refractive index and an affinity with a thermoplastic resin.

As to the above-mentioned radical polymerization initiator and the chain transfer agent employed if necessary, which can be employed in emulsion polymerization for the acrylic rubber latex and the conjugated diene rubber latex, there is no particular limitation as long as they are ones employed in a conventional radical polymerization.

Examples of the radical polymerization initiator are an organic peroxide such as cumen hydroperoxide, tert-butyl peroxide, benzoyl peroxide, tert-butylperoxy isopropyl carbonate, di-tert-butyl peroxide or lauroyl peroxide, an inorganic peroxide such as ammonium persulfate or potassium persulfate, an azo compound such as 2,2'-azobisisobutyronitrile or 2,2'-azobis-2,3-dimethylvaleronitrile, and the like. Among those, the organic peroxide and the inorganic peroxide are particularly preferable from the viewpoint of high reactivity.

In the case that the organic peroxide or the inorganic peroxide is employed, there can be employed together, as a reducing agent, a mixture such as ferrous sulfate/glucose/sodium pyrophosphate, ferrous sulfate/dextrose/sodium pyrophosphate or ferrous sulfate/formaldehyde sodium sulfoxylate/ethylenediamineacetate salt. The combination use of the reducing agent is particularly preferable from the viewpoint of lowering polymerization temperature.

The amount of the radical polymerization initiator is usually from 0.005 to 10 parts, preferably from 0.01 to 5 parts, more preferably from 0.02 to 2 parts, based on 100 parts of the used monomer mixture.

If the amount of the radical polymerization initiator is too small, polymerization rate tends to lower and preparation efficiency tends to lower. If the amount is too large, the molecular weight of the resulting acrylic rubber or the conjugated diene rubber and accordingly the impact resistance tend to lower.

Examples of the chain transfer agent are t-dodecylmercaptan, n-octylmercaptan, n-tetradecylmercaptan, n-hexylmercaptan and the like.

The chain transfer agent is an optical component, and if used, the amount thereof is preferably from 0.001 to 5 parts based on 100 parts of a monomer mixture from the viewpoint of revealing impact resistance.

Examples of emulsifier employed in the emulsion polymerization are, for example, a metallic salt of fatty acid such as potassium oleate, sodium oleate, potassium rhodinate, sodium rhodinate, potassium palmitate, sodium palmitate or potassium stearate, besides the emulsifier usable in the preparation of the above-mentioned silicone rubber latex (A). These can be employed solely or in combination of two or more thereof.

As for the mixing ratio of the silicone rubber latex (A) and the acrylic rubber latex and/or conjugated diene rubber latex (B) in the presence of the mixed latex, they are mixed so that the content based on the total rubber component is from 1 to 90%, preferably from 5 to 60%, more preferably from 10 to 50%, within which the effect of the present invention of imparting a high impact resistance to a thermoplastic resin is obtained. If the silicone content in the total rubber component is too small or too large, the effect produced by coagglomerating particles of the mixed latex is not obtained enough and an improvement in impact resistance of thermoplastic resin is not satisfactory.

The concentration of solid component in the above-mentioned mixed latex is preferably from 10 to 50%, particularly from 20 to 40%, from the viewpoint that it is easy to coagglomerate particles of the latex.

The coagglomerated rubber of enhanced particle size prepared by coagglomerating rubber particles of the above-mentioned mixed latex has preferably an average particle diameter of at least 150 nm, particularly at least 200 nm, and at most 1200 nm, particularly at most 1000 nm, from the viewpoint of revealing impact resistance. The coagglomerated rubber having such an average particle diameter contains rubber particles in such a state that silicone rubber particles from the silicone rubber latex (A) and acrylic rubber particles and/or conjugated diene rubber particles from the acrylic rubber latex and/or conjugated diene rubber latex (B) are coagglomerated and combined with each other. Therefore, it is considered that, when molding products are prepared by incorporating the resulting graft copolymer particles into a thermoplastic resin, relaxation of stress is facilitated, when receiving impact, due to production of voids in rubber resulting from the stress concentrated in rubber particles.

The coagglomeration of particles of the mixed latex can be carried out according to a general method, for example, wherein there are added, to the mixed latex, an inorganic salt such as sodium sulfate, an inorganic acid such as hydrochloric acid, a latex of a copolymer having an acid functional group prepared by copolymerizing an unsaturated acid monomer and alkyl (meth)acrylate monomer and the like. It is preferable that coagglomeration of particles is carried out using from 0.1 to 15 parts (solid), particularly from 0.2 to 10 parts (solid) of the latex of a copolymer having an acid functional group based on 100 parts (solid) of the mixed latex from the viewpoint of that clots after coagglomeration process becomes few.

If the amount of the latex of a copolymer having an acid functional group is small, the coagglomeration tends to become difficult substantially. The more the amount of the latex of a copolymer having an acid functional group is employed, the smaller an average particle diameter of a coagglomerated rubber is. Further, if the amount thereof is more than 15 parts, unpreferable phenomenon such as lower impact resistance occurs more easily.

The above-mentioned latex of a copolymer having an acid functional group can be prepared by copolymerizing from 1 to 30%, particularly from 1 to 25% of a unsaturated acid monomer, from 35 to 99%, particularly from 50 to 99% of an alkyl (meth)acrylate monomer, and from 0 to 35%, particularly from 0 to 25% of another monomer polymerizable thereto, using a radical polymerization initiator and, if necessary, a chain transfer agent usable in the preparation of the above-mentioned acrylic rubber latex or the above-mentioned conjugated diene rubber latex, according to a conventional method of emulsion polymerization (for example, methods described in Japanese Unexamined Patent Publication Nos. 25655/1975, 12703/1996 and 12704/1996, etc.).

Examples of the above-mentioned unsaturated acid monomer are acrylic acid, methacrylic acid, itaconic acid, a monoester of itaconic acid, maleic acid, a monoester of maleic acid, crotonic acid, fumaric acid, cinnamic acid, sorbic acid and the like. These may be employed solely or in combination of two or more thereof.

Examples of the above-mentioned alkyl (meth)acrylate monomer are the same momoners as the alkyl (meth)acrylate monomers employed in the preparation of the above-mentioned acrylic rubber latex and further an alkyl methacrylate monomer containing an alkyl group having 1 to 3 carbon atoms such as methyl methacrylate, ethyl methacrylate or propyl methacrylate. These monomers may be employed solely or in combination of two or more thereof. It is particular preferable to employ an alkyl acrylate and an alkyl methacrylate together, from the viewpoint that the coagglomeration rate is made moderate. The desirable weight ratio of these esters (alkyl acrylate/alkyl methacrylate) is at least 5/95, preferably at least 10/90, and at most 50/50, preferably at most 45/55.

Examples of the above-mentioned other copolymerizable monomer are, for example, an aromatic vinyl monomer such as styrene, $\alpha$-methylstyrene or p-methylstyrene, a vinyl cyanide monomer such as acrylonitrile or methacrylonitrile, a monomer having at least two polymerizable unsaturated bonds in its molecule such as diallyl phthalate, triallyl cyanurate, triallyl isocyanurate, allyl methacrylate, ethyleneglycol dimethacrylate or divinylbenzene, and the like. These monomers may be employed solely or in combination of two or more thereof.

If the content of the unsaturated acid monomer unit in the copolymer having an acid functional group contained in the above-mentioned latex of a copolymer having an acid functional group is too small, the ability to enhance particle diameter by coagglomerating particles of the mixed latex tends to substantially disappear. If the content is too large, a latex of a copolymer having an acid functional group could be obtained by polymerization, however, the copolymer tends to be unsuitable for industrial manufacture due to the production of clots and the increase of viscosity of latex during polymerization. Whether the content of the above-mentioned alkyl (meth)acrylate monomer unit is too small or too large, the ability for coagglomerating particles lowers and unagglomerated particles increase. If the content of the above-mentioned other polymerizable monomer unit is too large, the ability for enhancing particle size by coagglomerating particles tends to lower and unagglomerated particles increase. Particularly, when the monomer having at least two polymerizable unsaturated bonds in its molecule is employed, the monomer should be employed in the range of from 0 to 3%. If the amount thereof is more than the above-mentioned range, the ability for enhancing particle size by coagglomerating considerably lowers.

In the case of preparing the above-mentioned latex of a copolymer having an acid functional group, it is preferable to divide into two portions of monomers employed for preparing a latex of a copolymer having an acid functional group to polymerize them by two steps, not by one step. For example, at the first step of polymerization, there is employed preferably 5 to 40%, more preferably from 8 to 35% of total amount of the monomer employed for preparing a latex of a copolymer having an acid functional group to obtain a copolymer having a low Tg of preferably from −95° to 40° C., more preferably from −80° to 30° C., most preferably from −70° to 20° C. And then at the second step of polymerization, to the obtained copolymer at first step, there is added the rest of the total amount of the monomer employed for preparing a latex of a copolymer having an acid functional group, i.e., preferably from 60 to 95%, more preferably from 65 to 92% of the total amount, to obtain a copolymer having a high Tg of preferably from −20° to 80° C., more preferably from −10° to 70° C., most preferably 25° to 60° C.

The above-mentioned preparation method has the advantages that the amount of produced clots is small when preparing a latex of a copolymer having an acid functional group and a resulting latex of a copolymer having an acid functional group is excellent in property of enhancing particle size by coagglomerating particles.

A preferable latex of a copolymer having an acid functional group is one having an average particle diameter of from 30 to 1200 nm, a concentration of solid component of from 10 to 40%, and a pH of from 1.5 to 6.

The above-mentioned latex of a copolymer having an acid functional group employed for coagglomerating particles may be employed solely or in combination of two or more thereof. By using two or more kinds of latexes of a copolymer having an acid functional group different in an ability for enhancing particle size by coagglomerating particles, it is possible to obtain a latex of a coagglomerated rubber, having a two-peak distribution or a broad distribution of particle diameter. A temperature in the coagglomeration process is preferably from 20° to 90° C., particularly from 40° to 70° C.

To carry out coagglomeration, the above-mentioned latex of a copolymer having an acid functional group may be added to a rubber latex after the temperature of the rubber latex reached the coagglomerating temperature, or the latex may be added to a rubber latex at a temperature of at most 40° C. and the resulting mixture is heated up to from 40° to 90° C. with stirring. In contrast with this, a rubber latex of which rubber particles is to be coagglomerated may be supplied to a vessel previously charged with a latex of a copolymer having an acid functional group.

In the above-mentioned coagglomeration process, from 0.01 to 5 parts of an inorganic salt may be employed together, in addition to the latex of a copolymer having an acid functional group, based on 100 parts (solid) of the mixed latex. Addition of an inorganic salt is effective for improving the coagglomeration effect.

As the above-mentioned inorganic salt, there can be employed an alkali metallic salt such as sodium chloride or sodium sulfate, and an oxygen acid salt such as potassium alum. These may be employed solely or in combination of two or more thereof. The pH in the coagglomeration process is preferably at least 7. In the case of the pH of less than 7, the coagglomeration is difficult.

In order to increase the coagglomeration rate, the pH is preferably controlled to be at least 9.

For controlling the pH, one or more of compounds such as sodium hydroxide, potassium hydroxide, sodium carbonate and sodium hydrogencarbonate may be added in a proper amount.

The concentration in a latex employed for the coagglomeration process is also an important factor. By adjusting a rubber concentration, it is possible to control the particle diameter of coagglomerated rubber particles of enhanced particle size. The particle diameter distribution in the resulting latex of a coagglomerated rubber varies depending on the composition of a latex of a copolymer having an acid functional group which is employed for coagglomeration, and the particle diameter of coagglomerated rubber particles tends to become small by lowering the rubber concentration.

The particle diameter in a latex of a coagglomerated rubber of enhanced particle size can be controlled by adding an emulsifier in the process of coagglomeration for enhancing particle size to change the surface covering ratio of the rubber latex particles. Namely, a particle diameter of a coagglomerated rubber particles can be reduced to smaller one in comparison with the case of using no emulsifier, due to increasing a covering ratio of surface with an emulsifier by adding an emulsifier.

The graft copolymer particles of the present invention is prepared by graft-copolymerizing a vinyl monomer to the latex of a coagglomerated rubber prepared in the above-mentioned process.

The above-mentioned vinyl monomer is employed to enhance the compatibility between the resulting graft copolymer particles and a thermoplastic resin to be blended herewith and to uniformly disperse the graft copolymer particles into the thermoplastic resin.

The above-mentioned graft copolymer particles have such a structure that a vinyl monomer is grafted to rubber particles obtained by coagglomerating silicone rubber particles in a silicone rubber latex (A) and acrylic rubber particles and/or conjugated diene rubber particles in an acrylic rubber latex and/or conjugated diene rubber latex (B). The average particle diameter thereof is preferably at least 160 nm, particularly at least 200 nm, and is preferably at most 1300 nm, particularly at most 1000 nm. When the average particle diameter is less than 160 nm or more than 1300 nm, impact resistance tends to lower. The content of a solvent-insoluble portion in the graft copolymer is preferably at least 70%, particularly at least 80%. When the content of a solvent-insoluble portion is less than 70%, impact resistance tends to lower.

Examples of the above-mentioned vinyl monomer are, for example, an aromatic vinyl monomer such as styrene, α-methylstyrene or p-methylstyrene; a vinyl cyanide monomer such as acrylonitrile or methacrylonitrile; a vinyl halide monomer such as vinyl chloride, vinylidene chloride or vinylidene fluoride; methacrylic acid monomer; a methacrylate monomer such as methyl methacrylate, ethyl methacrylate, butyl methacrylate, glycidyl methacrylate or hydroxyethyl methacrylate; acrylic acid monomer; an acrylate monomer such as methyl acrylate, butyl acrylate, glycidyl acrylate or hydroxyethyl acrylate; and the like. These may be employed solely or in combination of two or more thereof.

The above-mentioned vinyl monomer is employed preferably in an amount of 95 to 5 parts, particularly from 90 to 10 parts, so that the total amount thereof with 5 to 95 parts (solid), particularly from 10 to 90 parts (solid), of a latex of coagglomerated rubber is 100 parts. When the amount of the above-mentioned vinyl monomer is too large, the amount of the rubber component tends to be too small to reveal sufficient impact resistance. On the other hand, when the amount of the vinyl monomer is too small, compatibility with a thermoplastic resin as a matrix resin deteriorates when mixing it with the thermoplastic resin and the impact resistance tends to lower.

The above-mentioned graft polymerization can be carried out according to a conventional method of emulsion polymerization. The radical polymerization initiator, the chain transfer agent employed if necessary, and the emulsifier added if necessary, may be those employed for preparing the acrylic rubber latex or the conjugated diene rubber latex. Also, as limitation in the amounts thereof, the same limitations as those in the preparation of the acrylic rubber latex or the conjugated diene rubber latex are applicable to this case.

The graft copolymer particles after the polymerization may be employed as a polymer separated from a latex, or may be employed as a latex. A method for separating the polymer from the latex is a conventional method, for example, a method wherein a latex is coagulated by adding a metallic salt such as calcium chloride, magnetic chloride or magnesium sulfate, an inorganic acid or an organic acid such as hydrochloric acid, sulfuric acid, phosphoric acid or acetic acid to the latex, followed by separating, washing, dehydrating and drying. Spray drying method can be also employed therefor.

Thus obtained graft copolymer particles, as a separated polymer or as a latex, are mixed with various kinds of thermoplastic resins to give a thermoplastic resin composition having an improved impact resistance.

Examples of the above-mentioned thermoplastic resin are poly(vinyl chloride), polystyrene, styrene-acrylonitrile copolymer, styrene-acrylonitrile-N-phenylmaleimide copolymer, α-methylstyrene-acrylonitrile copolymer, poly (methyl methacrylate), methyl methacrylatestyrene copolymer, polycarbonate, polyamide, polyester such as poly(ethylene terephthalate) or poly(butylene terephthalate), ABS resin, AAS resin, AES resin, poly(phenylene ether)-polystyrene composite resin and the like.

The amount of the graft copolymer particles is from 1 to 150 parts based on 100 parts of a thermoplastic resin, and preferably from 5 to 120 parts from the viewpoint of physical property balance. If the amount thereof is too small, impact resistance of the thermoplastic resin is not improved sufficiently. On the other hand, if the amount thereof is too large, it is difficult to maintain physical properties of the thermoplastic resin such as rigidity and surface hardness.

The mixing of the graft copolymer particles separated as polymer particles from a latex and a thermoplastic resin can be carried out by mixing them by means of a Henschel mixer, a ribbon blender or the like and then by melt-kneading by means of rolls, an extruder, a kneader or the like.

At that time additives usually employed can be incorporated, for example, a plasticizer, a stabilizer, a lubricant, an ultraviolet ray absorber, an antioxidant, a flame retarder, a pigment, a glass fiber, a filler, a polymer processing aid, a polymer lubricant and the like.

In the case that the above-mentioned thermoplastic resin is prepared according to an emulsion polymerization method, it is possible to obtain a thermoplastic resin composition by blending a latex of the thermoplastic resin and a latex of the graft copolymer particles in the form of emulsion and then by co-coagulating them.

As a method for molding the obtained thermoplastic resin composition, there can be employed methods employed for molding a conventional thermoplastic resin composition, for example, injection molding, extrusion molding, blow molding, calendar molding and the like.

The obtained molded products are excellent in impact resistance, weather resistance, processability, thermal discoloration resistance and appearance of molded products, compared with those containing a conventional impact modifier.

The present invention is then explained concretely based on Examples, but is not limited thereto.

Evaluations in the following Examples and Comparative Examples were carried out in the manner mentioned below.

Concentration of Solid Component of a Latex (Residue After Heat Drying) and Polymerization Conversion A sample of latex obtained after reaction was dried in a hot-air drier at 120° C. for one hour, and the concentration of solid component (residue after heat drying) was measured, and then the polymerization conversion was calculated by using the equation of (amount of solid/amount of charged monomer)×100 (%)

Amount of Insoluble Portion in Solvent (Gel Content)

A sample for measurement was obtained by drying a latex at 50° C. for 75 hours and further at room temperature for 8 hours in vacuum. The sample was immersed in toluene at room temperature for 24 hours, followed by centrifuging at 12000 rpm for 60 minutes, and the weight percentage of the toluene-insoluble portion in sample was measured.

Average Particle Diameter

A volume average particle diameter was measured according to dynamic light scattering method by means of a particle size analyzer NICOMP MODEL 370 (made by PACIFIC SCIENTIFIC INC.) as a measuring instrument.

Weight Average Molecular Weight

A weight average molecular weight converted to that of polystyrene was measured by size exclusion chromatography (SEC) using THF as an eluent.

Izod Impact Strength

Measurement was made at −30° C., 0° C. and 23° C. in accordance with ASTM D-256 using ¼ inch notched bar.

Falling Weight Impact Strength

A 50% failure energy at which 50% of the number of test specimens were broken at −30° C. and 23° C. ((weight of falling weight)×(height)) (kg.m) was measured by using a plate test specimen of 150 mm×100 mm×2 mm prepared by injection molding.

Processability in Injection Molding

Flow length of a resin in spiral die having 3 mm thickness was measured by injection molding the resin by means of injection molding machine FAS100B (made by FANUC LTD.) at a cylinder temperature of 250° C. and under an injection pressure of 1350 kgf/cm$^2$.

Thermal Resistance (HDT)

Heat distortion temperature (HDT) (° C.) under 18.6 kg/cm$^2$ load was measured in accordance with ASTM D-648.

Initial Color Tone

Color difference (ΔE) was measured by means of a color difference meter Sigma (Σ) 80 (made by Nippon Densyoku Ind. Co., Ltd.).

Thermal Discoloration Resistance

A sample was maintained in a constant temperature drier in which hot air was circulated (made by Satake Kagaku Kikai Kogyo Corporation) at 200° C. for 30 minutes, and a degree of discoloration by heat between before and after the maintenance was evaluated by color difference (ΔE)

PREPARATION EXAMPLE 1

Preparation of Silicone Rubber Latex (A-1)

An emulsion was prepared by adding a mixed liquid of 20 parts of octamethylcyclotetrasiloxane (D4), 0.4 part of mercaptopropyldimethoxymethylsilane (MPrDMS) and 0.2 part of tetraethoxysilane (TEOS) to an aqueous solution of 1.5 parts of sodium dodecylbenzene sulfonate (SDBS) in 200 parts of pure water and stirring the resulting mixture at 10000 rpm for 5 minutes by means of a homomixer. A five-necked flask equipped with a stirrer, a reflux condenser, a nitrogen feeding port, a monomer feeding port and a thermometer was charged at one time with the emulsion. After heating the emulsion to 90° C. over about 40 minutes with stirring the system in nitrogen stream, 2.0 parts of dodecylbenzenesulfonic acid (DBSA) was added thereto and the reaction was carried out at 90° C. for 3 hours to give a silicone rubber latex to be employed as a seed. The polymerization conversion was 84%. The silicone rubber particles in the latex had a volume average particle diameter of 40 nm. The pH of the latex was 1.3.

Independently, an emulsion containing raw materials of silicone rubber was prepared by stirring a mixture comprising the following components by means of a homomixer at 10000 rpm for 5 minutes.

| | |
|---|---|
| Pure water | 70 parts |
| SDBS | 0.5 part |
| D4 | 80 parts |
| MPrDMS | 1.6 parts |
| TEOS | 0.8 part |

The obtained emulsion containing raw materials of silicone rubber was added at one time to the silicone rubber latex as a seed with stirring the silicone rubber latex. Stirring was continued for 4 hours and then the system was cooled to 25° C. and allowed to stand for 20 hours. The polymerization was finished by adjusting the pH to 8.9 with sodium hydroxide to give a silicone rubber latex (A-1). The conversion of polymerization of the raw materials of silicone rubber was 87%. The obtained latex had a concentration of solid component of 25%, an average particle diameter of 80 nm and a gel content of 85%.

PREPARATION EXAMPLE 2

Preparation of Silicone Rubber Latex (A-2)

A silicone rubber latex (A-2) was obtained by carrying out a polymerization in the same manner as in Preparation Example 1 except that in the raw materials of silicone rubber used in Preparation Example 1, TEOS was not used and γ-methacryloyloxypropyldimethoxymethylsilane (DSIMA) was used instead of MPrDMS. The obtained latex had a concentration of solid component of 25%, an average particle diameter of 85 nm and a weight average molecular weight converted to polystyrene of 250,000.

PREPARATION EXAMPLE 3

Preparation of Silicone Rubber Latex (A-3)

A five-necked flask equipped with a stirrer, a reflux condenser, a nitrogen feeding port, a monomer feeding port and a thermometer was charged at one time with 100 parts (solid) of the silicone rubber latex (A-2) obtained in Preparation Example 2. The system was heated up to 60° C. with stirring in nitrogen stream. After reaching 60° C., 0.2 part of t-butylperoxyisopropyl carbonate as a radical polymerization initiator was added and stirring was continued for 10 minutes.

To the system there was added 0.2 part of sodium formaldehydesulfoxylate (SFS), 0.01 part of disodium ethylenediaminetetraacetate (EDTA) and 0.0025 part of ferrous sulfate, and the mixture was stirred for 2 hours to finish cross-linking reaction. Then a silicone rubber was latex (A-3) was obtained. The obtained latex had a concentration of solid component of 25%, an average particle diameter of 85 nm and a gel content of 90%.

PREPARATION EXAMPLE 4

Preparation of Silicone Rubber Latex (A-4) : a Latex of a Composite Rubber Comprising a Silicone Rubber and an Acrylic Rubber A five-necked flask equipped with a stirrer, a reflux condenser, a nitrogen feeding port, a monomer feeding port and a thermometer was charged at one time with 160 parts of pure water, 1.5 parts of SDBS, 0.4 part of SFS, 0.01 part of EDTA and 0.0025 part of ferrous sulfate.

The system was heated up to 40° C. with stirring in nitrogen steam. After reaching 40° C., thereto was added at one time 15% of a monomer mixture comprising 30 parts of butyl acrylate (BA), 0.3 part of allyl methacrylate (AlMA), 0.6 part of γ-methacryloyloxypropyl trimethoxysilane (TSMA) and 0.02 part of cumene hydroperoxide (CHP) and the system was stirred for one hour. The rest of the monomer mixture was continuously added dropwise over one hour and, after the completion of adding, stirring was continued for one hour to finish polymerization. Thus an acrylic rubber latex was obtained. The conversion was 99%. The obtained latex hada concentration of solid component of 17%, an average particle diameter of 60 nm and a gel content of 99%.

Independently, a mixture of raw materials of silicone rubber comprising 100 parts of pure water, 0.1 part of SDBS, 70 parts of D4 and 1.8 parts of TEOS was stirred at 10000 rpm for 10 minutes by means of a homomixer to give an emulsion.

The system of the above-mentioned acrylic rubber latex was heated up to 85° C. over about 40 minutes, and thereto 1.5 parts of DBSA was added. Then thereto was added dropwise the above-mentioned mixture emulsion containing raw materials of silicone rubber over 3 hours. Stirring at 85° C. was continued for one hour, the system was cooled to 25° C. and maintained for hours. Then the polymerization was finished by adjusting the pH of the system to 9.5 with sodium hydroxide to give a latex of a composite rubber comprising a silicone rubber and an acrylic rubber (silicone rubber latex (A-4)). The polymerization conversion of the raw materials of silicone rubber was 84%. The obtained latex had a concentration of solid component of 26%, and average particle diameter of 81 nm and a gel content of 89%.

PREPARATION EXAMPLE 5

Preparation of poly(butyl acrylate) Rubber Latex (B-1)

A five-necked flask equipped with a stirrer, a reflux condenser, a nitrogen feeding port, a monomer feeding port and a thermometer was charged at one time with 200 parts of pure water, 1.5 parts of sodium rhodinate, 0.4 part of SFS, 0.01 part of EDTA and 0.0025 part of ferrous sulfate.

The system was heated up to 40° C. with stirring in nitrogen stream. After reaching 40° C., a mixture comprising 100 parts of BA, 1 part of AlMA and 0.1 part of CHP was continuously added dropwise over 6 hours. After the completion of addition, stirring was continued at 40° C. for 1 hour to finish the polymerization. The polymerization conversion was 97%. The obtained latex had a pH of 8.2, a concentration of solid component of 32%, an average particle diameter of 80 nm and a gel content of 99%.

PREPARATION EXAMPLE 6

Preparation of polybutadiene Rubber Latex (B-2)

An autoclave was charged with 200 parts of pure water, 0.2 part of potassium persulfate (KPS) and 0.2 part of t-dodecylmercaptane (t-DM). After removing air in the autoclave by a vacuum pump, the autoclave was further charged with 1 part of sodium oleate, 2 parts of sodium rhodinate and 100 parts of butadiene.

The system was heated up to 60° C. to start the polymerization. The polymerization was finished in 12 hours. The polymerization conversion was 96%. The obtained rubber latex had a pH of 8.6, a concentration of solid component of 32%, an average particle diameter of 70 nm and a content of 85%.

PREPARATION EXAMPLE 7
Preparation of a Latex of a Copolymer Having an Acid Functional Group (S)

A five-necked flask equipped with a stirrer, a reflux condenser, a nitrogen feeding port, a monomer feeding port and a thermometer was charged at one time with 200 parts of pure water, 0.6 part of sodium dioctylsulfosuccinate, 0.04 part of SFS, 0.01 part of EDTA and 0.0025 part of ferrous sulfate.

The system was heated up to 65° C. with stirring in nitrogen stream. After reaching 65° C., to the system was continuously added dropwise a monomer mixture at a first step comprising 5 parts of butyl methacrylate (BMA), 20 parts of BA, 0.1 part of t-DM and 0.05 part of CHP. After the completion of addition, thereto was continuously added dropwise a monomer mixture at a second step comprising 60 parts of BMA, 15 parts of methacrylic acid (MAA), 0.2 part of t-DM and 0.15 part of CHP. The monomer mixtures at the first step and the second step were added dropwise continuously and constantly for 5 hours. At 2 hours after starting addition, 0.6 part of sodium dioctylsulfosuccinate was added. After the completion of addition, stirring was continued at 65° C. for one hour to finish the polymerization. Thus a latex of a copolymer having an acid functional group(s) was obtained. The polymerization conversion was 98%. The obtained latex had a concentration of solid component of 33%, a gel content of 0% and an average particle diameter of 100 nm.

PREPARATION EXAMPLES 8 TO 10
Preparation of Aromatic Vinyl Resins (T-1) to (T-3)

A five-necked flask equipped with a stirrer, a reflux condenser, a nitrogen feeding port, a monomer feeding port and a thermometer was charged with 250 parts of pure water, 1.0 part of sodium dioctylsulfosuccinate as an emulsifier, 0.5 part of SFS, 0.01 part of EDTA and 0.0025 part of ferrous sulfate. The system was heated up to 60° C. with stirring in nitrogen stream. After reaching 60° C., a monomer mixture at a first step shown in Table 1 was added at one time and further a momoner mixture at a second step was continuously added dropwise for 6 hours. And 0.5 part of sodium dioctylsulfosuccinate was added at one hour after and three hours after starting addition, respectively. After the completion of addition, stirring was continued at 60° C. for one hour and then latexes of aromatic vinyl resins (T-1) to (T-3) were obtained, respectively. The polymerization conversion and the concentration of solid component are shown in Table 1.

Abbreviations in Table 1 indicate the followings:
AN: acrylonitrle
ST: styrene
αS: α-methylstyrene
PMI: N-phenylmaleimide

TABLE 1

| Components of aromatic vinyl resin (parts) | Prep. Ex. No. 8 | Prep. Ex. No. 9 | Prep. Ex. No. 10 |
|---|---|---|---|
| Monomer mixture at a first step | | | |
| AN | 25 | — | 17 |
| ST | 75 | — | 63 |
| αS | — | 75 | — |
| PMI | — | — | 20 |
| t-DM | 0.3 | 0.2 | 0.2 |
| CHP | 0.2 | — | 0.3 |
| Monomer mixture at a second step | | | |
| AN | — | 25 | — |
| αS | — | — | — |
| t-DM | — | 0.2 | — |
| CHP | — | 0.3 | — |
| Polymerization conversion (%) | 99 | 95 | 98 |
| Concentration of solid component (%) | 29 | 28 | 29 |
| Abbreviation | T-1 | T-2 | T-3 |

EXAMPLE 1

(1) Preparation of graft copolymer particles (1) containing coagglomerated rubber prepared from a mixed latex of a silicone rubber latex and an acrylic rubber latex Twenty parts (solid) of silicone rubber latex (A-1) and 80 parts of acrylic rubber latex (B-1) were mixed and the mixture was stirred for 15 minutes and heated up to 60° C. After reaching 60° C., the pH of the system was adjusted to 10 by adding sodium hydroxide to the system and then 3.5 parts (solid) of the latex of a copolymer having an acid functional group (S) was added. Stirring was continued for 45 minutes to finish the coagglomeration of particles. The particle diameter of the obtained coagglomerated rubber particles of enhanced particle size was 310 nm.

A five-necked flask equipped with a stirrer, a reflux condenser, a nitrogen feeding port, a monomer feeding port and a thermometer was charged at one time with 240 parts of pure water, 60 parts (solid) of the coagglomerated rubber, 0.3 part of sodium oleate, 0.2 part of SFS, 0.01 part of EDTA and 0.0025 part of ferrous sulfate.

The system was heated up to 65° C. with stirring in nitrogen stream. After reaching 65° C., a mixture comprising 30 parts of styrene (ST), 10 parts of acrylonitrile (AN) and 0.01 part of CHP was continuously added dropwise over 3 hours. After the completion of addition, stirring was continued at 65° C. for one hour to finish the polymerization. Thus a latex of graft copolymer particles (I) was obtained. The obtained latex had a concentration of solid component of 29%, an average particle diameter of 350 nm and a gel content of 90%.

(2) Preparation and physical property evaluation of AN-ST resin containing the coagglomerated rubber The obtained latex of graft copolymer particles (I) and the latex of AN-ST copolymer (T-1) obtained in Preparation Example 9 were mixed so that the amount of the coagglomerated rubber was 20% in solid basis and then a latex of AN-ST resin containing the coagglomerated rubber was obtained. The latex was coagulated by adding 2 parts of calcium chloride thereto, and the coagulated slurry was dehydrated and dried to obtain a powder of AN-ST resin containing the coagglomerated rubber.

Subsequently, to 100 parts of the obtained AN-ST resin powder containing the coagglomerated rubber were added 0.2 part of a phenolic stabilizer (AO-20, available from Asahi Denka Kogyo KABUSIKI KAISHA) and 0.5 part of ethylenebisstearylamide. The mixture was melt-kneaded in a single-screw extruder (HW-40-28, made by Tabata Industrial Machinery Co., Ltd.) to prepare pellets. Test specimens for Izod impact strength and molded plates were prepared using the pellets by means of FAS 100B injection molding machine (made by FANUC LTD.) at a cylinder temperature of 240° C. Evaluation of Izod impact strength and falling weight impact strength were carried out and evaluation of appearance of molded products by visually observing molded plates were carried out. And processability in injection molding was evaluated using the pellets. The results are shown in Table 2.

COMPARATIVE EXAMPLE 1

In order to compare with Example 1, an AN-ST resin containing an acrylic rubber was prepared and physical properties of the resin were evaluated.

A five-necked flask equipped with a stirrer, a reflux condenser, a nitrogen feeding port, a monomer feeding port and a thermometer was charged at one time with 200 parts of pure water, 0.08 part of sodium rhodinate, 0.4 part of SFS, 0.01 part of EDTA and 0.0025 part of ferrous sulfate.

The system was heated up to 40° C. in nitrogen stream with stirring. After reaching 40° C., 10% of a mixture comprising 100 parts of BA, 1 part of AlMA and 0.1 part of CHP was added at one time. After stirring for one hour, the rest of the mixture was continuously added dropwise thereto over 6 hours. And 0.1 part of sodium rhodinate was added at one hour and three hours after starting polymerization, respectively. After the completion of adding the rest of the mixture, 0.1 part of sodium rhodinate was added, and stirring was continued for one hour to finish the polymerization. The polymerization conversion was 99%. The obtained latex had a concentration of solid component of 30%, an average particle diameter of 290 nm and a gel content of 98%.

In the same manner as in Example 1 except using the obtained acrylic rubber latex instead of the latex of coagglomerated rubber in Example 1, a latex of graft copolymer particles (I') was prepared and using the latex an AN-ST resin composition (AN-ST resin containing an acrylic rubber) was prepared. Physical properties of the composition were evaluated in the same manner as in Example 1. The results are shown in Table 2.

COMPARATIVE EXAMPLE 2

In order to compare with Example 1, an AN-ST resin containing silicone rubber was prepared and physical properties of the resin were evaluated.

A mixture comprising 200 parts of pure water, 1 part of SDBS, 1 part of DBSA, 100 parts of D4, 2 parts of MPrDMS and 1 part of TEOS, as a raw material of silicone rubber, was stirred at 10000 rpm for 5 minutes by means of a homomixer, and then passed twice through a high pressure homogenizer set at a pressure of 300 kgf/cm$^2$ to prepare an emulsion. The obtained emulsion was put at one time into a five-necked flask equipped with a stirrer, a reflux condenser, a nitrogen feeding port, a monomer feeding port and a thermometer. The system was heated to 90° C. over about 50 minutes and then stirred for 5 hours. Thereafter, the system was cooled to 25° C. and kept at that temperature for 20 hours and then, the pH was adjusted to 8.3 with a sodium hydroxide aqueous solution to finish the polymerization. Thus a silicone rubber latex was obtained. The polymerization conversion was 88.0%. The obtained latex had a concentration of solid component of 30%, an average particle diameter of 280 nm and a gel content of 85%.

In the same manner as in Example 1 excepting of using the obtained silicone rubber latex instead of the latex of coagglomerated rubber in Example 1, a latex of graft copolymer particles (II') was prepared and using the latex an AN-ST resin composition (AN-ST resin containing a silicone rubber) was prepared. Physical properties of the composition were evaluated in the same manner as in Example 1. The results are shown in Table 2.

COMPARATIVE EXAMPLE 3

In order to compare with Example 1, an AN-ST resin containing a composite rubber of a silicone rubber and an acrylic rubber was prepared and physical properties of the resin were evaluated. The composite rubber of a silicone rubber and an acrylic rubber was prepared according to the method described in Japanese Unexamined Patent Publication No. 100812/1992.

A five-necked flask equipped with a stirrer, a reflux condenser, a nitrogen feeding port, a monomer feeding port and a thermometer was charged at one time with 240 parts of pure water and 20 parts (solid) of the silicone rubber obtained in Comparative Example 2.

The system was heated up to 40° C. in nitrogen stream with stirring. After reaching 40° C., a mixed liquid comprising 80 parts of BA, 0.8 part of AlMA and 0.07 part of CHP was added at one time thereto. After addition, the mixture was stirred for 30 minutes. Then thereto was added at one time an aqueous solution comprising 5 parts of pure water, 0.2 part of SFS, 0.0025 part of ferrous sulfate and 0.01 part of EDTA to start polymerization. Stirring was continued for 2 hours to finish the polymerization. Thus, a latex of a composite rubber containing a silicone rubber and an acrylic rubber was obtained. The polymerization conversion was 98%. The obtained latex had a concentration of solid component of 30%, an average particle diameter of 330 nm and a gel content of 96%.

In the same manner as in Example 1 except using the obtained a latex of the composite rubber containing a silicone rubber and an acrylic rubber instead of the latex of coagglomerated rubber in Example 1, a latex of graft copolymer particles (III') was prepared. Using the latex an AN-ST resin composition (AN-ST resin containing a composite rubber of a silicone rubber and an acrylic rubber) was prepared. Physical properties of the composition were evaluated in the same manner as in Example 1. The results are shown in Table 2.

COMPARATIVE EXAMPLE 4

In order to compare with Example 1, a blended resin of an AN-ST resin containing an acrylic rubber and an AN-ST resin containing a silicone rubber was prepared and physical properties thereof were evaluated. The latex of AN-ST resin containing an acrylic rubber obtained in Comparative Example 1 and the latex of AN-ST resin containing a silicone rubber obtained in Comparative Example 2 were mixed so that the ratio of the acrylic rubber/the silicone rubber was 80/20. The obtained mixed latex was coagulated, dehydrated and dried in the same manner as in Example 1 to obtain a blended resin. Physical properties of the blended resin were evaluated in the same manner as in Example 1. The results are shown in Table 2.

Evaluation of appearance of molded products in Table 2 was carried out, using molded plates used for a test of falling weight impact strength, by observing it with naked eyes, and a plate having excellent surface condition was estimated as ○, and a plate with a pattern of black lines on the surface was estimated as X.

TABLE 2

|  | Izod impact strength (kg · cm/cm) | | Falling weight Impact strength (kg · m) | | Processability in injection molding (mm) | Appearance of molded products |
| --- | --- | --- | --- | --- | --- | --- |
|  | 23° C. | −30° C. | 23° C. | −30° C. | | |
| Ex. No. 1 | 19 | 8 | 6.2 | 2.3 | 710 | ◯ |
| Com. Ex. No. | | | | | | |
| 1 | 8 | 2 | 4.8 | 1.7 | 590 | ◯ |
| 2 | 12 | 7 | 3.1 | 2.0 | 650 | X |
| 3 | 12 | 6 | 5.2 | 1.9 | 660 | ◯ |
| 4 | 10 | 3 | 5.0 | 1.9 | 610 | X |

As is clear from Table 2, it is seen that the AN-ST resin composition containing the graft copolymer particles of coagglomerated rubber of the present invention is excellent in impact resistant, processability and appearance of molded products, compared with each of a resin composition containing an acrylic rubber, a silicone rubber or a conventional composite rubber of a silicone rubber and an acrylic rubber, or a blended resin.

EXAMPLES OF 2 TO 5 AND COMPARATIVE EXAMPLE 5

(1) Preparation of graft copolymer particles (II) to (V) and (IV') containing coagglomerated rubber prepared from a mixed latex of a silicone rubber latex and an acrylic rubber latex As Examples 2 to 5, latexes of coagglomerated rubber and latexes of graft copolymer particles (II) to (V) containing the coagglomerated rubber were prepared in the same manner as in Example 1 except changing the kind and amount of a silicone rubber latex and an acrylic rubber latex in Example 1 to those shown in Table 3.

As Comparative Example 5, a latex of agglomerated rubber and a latex of graft copolymer particles (IV') containing the agglomerated rubber were prepared in the same manner as in Example 1 except using only an acrylic rubber latex as shown in Table 3.

Table 3 shows the average particle diameter of the obtained coagglomerated rubber particles and the agglomerated rubber particles, the polymerization conversion of graft-polymerization and the concentration of solid component of latex of graft copolymer particles.

(2) Preparation of AN-ST resin composition and evaluation of physical properties thereof AT-ST resin compositions were prepared using the latexes containing graft copolymers (II) to (V) and (IV'), respectively, in the same manner as in Example 1.

And evaluation of Izod impact strength, processability and appearance of molded products was carried out in the same manner as in Example 1. The results are shown in Table 4.

TABLE 4

|  | Graft copolymer particles | Izod impact strength (kg · cm/cm) | | Processability in injection molding (mm) | Appearance of molded products |
| --- | --- | --- | --- | --- | --- |
|  | | 23° C. | −30° C. | | |
| Ex. No. | | | | | |
| 2 | II | 16 | 6 | 700 | ◯ |
| 3 | III | 18 | 8 | 720 | ◯ |
| 4 | IV | 20 | 10 | 720 | ◯ |
| 5 | V | 17 | 7 | 710 | ◯ |
| Com. Ex. No. 5 | IV' | 9 | 8 | 610 | ◯ |

As is clear from the results of Table 4, it is seen that the composition using the graft copolymer particles comprising coagglomerated rubber prepared from silicone rubber particles and acrylic rubber particles shows high impact resistance and excellent processability compared with the composition using the graft copolymer particles comprising the agglomerated rubber prepared from only acrylic rubber particles. It is also seen that the impact resistance, processability and appearance of molded products are excellent even in the case of changing the ratio of an acrylic rubber and a silicone rubber in the coagglomerated rubber.

EXAMPLES 6 TO 8 AND COMPARATIVE EXAMPLE 6

(1) Preparation of graft copolymer particles (VI) to (VIII) and (V') containing coagglomerated rubber prepared from a mixed latex of a silicone rubber latex and a butadiene rubber latex As Examples 6 to 8, latexes of graft copolymer particles (VI) to (VIII) containing coagglomerated rubber were prepared in the same manner in Example 1 except that the butadiene rubber latex (B-2) was used instead of the acrylic rubber latex (B-1) in Example 1 and the kind and amount of a silicone rubber latex and a butadiene rubber latex were changed to those shown in Table 5.

TABLE 3

|  | Silicone rubber latex | | Acrylic rubber latex | | Average particle diameter of (co)agglomerated rubber (nm) | Graft polymerization conversion (%) | Average particle diameter of graft copolymer (nm) | Concentration of solid component (%) | Abbreviation |
| --- | --- | --- | --- | --- | --- | --- | --- | --- | --- |
|  | Kind | Parts (solid) | Kind | Parts (solid) | | | | | |
| Ex. No. | | | | | | | | | |
| 2 | (A-2) | 10 | (B-1) | 90 | 320 | 99 | 385 | 29 | II |
| 3 | (A-1) | 30 | (B-1) | 70 | 300 | 98 | 370 | 29 | III |
| 4 | (A-3) | 30 | (B-1) | 70 | 300 | 98 | 365 | 29 | IV |
| 5 | (A-1) | 40 | (B-1) | 60 | 280 | 99 | 340 | 29 | V |
| Com. Ex. No. | | | | | | | | | |
| 5 | — | — | (B-1) | 100 | 320 | 98 | 380 | 29 | IV' |

As Comparative Example 6, a latex of agglomerated rubber and a latex of graft copolymer particles (V') containing the agglomerated rubber were prepared in the same manner as in Example 1 except using only a butadiene rubber latex as shown in Table 5.

Table 5 shows the average particle diameter of the obtained coagglomerated rubber particles and the agglomerated rubber particles, the polymerization conversion of graft polymerization, the concentration of solid component in the latex of graft copolymer particles and the average particle diameter of graft copolymer particles.

at a polymerization temperature of 60° C. After addition, stirring was continued for one hour to finish the polymerization. And as Comparative Examples 7 and 8, latexes of graft copolymer particles (VI') and (VII') containing a composite rubber of a silicone rubber and an acrylic rubber were obtained by carrying our the same graft polymerization using the composite rubber of a silicone rubber and an acrylic rubber prepared in Comparative Example 3.

TABLE 5

| | Silicone rubber latex | | Butadiene rubber latex | | Average particle diameter of | Graft polymerization | Average particle diameter of | Concentration of | |
|---|---|---|---|---|---|---|---|---|---|
| | Kind | Parts (solid) | Kind | Parts (solid) | (co)agglomerated rubber (nm) | conversion (%) | graft copolymer (nm) | solid component (%) | Abbreviation |
| Ex. No. | | | | | | | | | |
| 6 | (A-1) | 15 | (B-2) | 85 | 330 | 99 | 395 | 29 | VI |
| 7 | (A-4) | 25 | (B-2) | 75 | 310 | 98 | 370 | 29 | VII |
| 8 | (A-1) | 30 | (B-2) | 70 | 300 | 98 | 360 | 29 | VIII |
| Com. Ex. No. | | | | | | | | | |
| 5 | — | — | (B-2) | 100 | 340 | 98 | 400 | 29 | V' |

(2) Preparation of an AN-ST resin composition and evaluation of physical properties AN-ST resin compositions were prepared using the latexes containing graft copolymers (VI) to (VIII) and (V'), respectively, in the same manner as Example 1. And evaluation of Izod impact strength and falling weight impact strength was carried out in the same manner as in Example 1. The results are shown in Table 6.

TABLE 6

| | Izod impact strength (kg · cm/cm) | | Falling weight impact strength at 23° C. |
|---|---|---|---|
| | 23° C. | −30° C. | (kg · m) |
| Ex. No. | | | |
| 6 | 32 | 12 | 5.5 |
| 7 | 30 | 14 | 5.2 |
| 8 | 33 | 14 | 5.3 |
| Com. Ex. No. 6 | 26 | 9 | 4.4 |

As is clear from the results of Table 6, it is seen that the composition using the graft copolymer particles comprising coagglomerated rubber prepared from silicone rubber particles and butadiene rubber particles shows high impact resistance compared with the composition using the graft copolymer particles comprising the agglomerated rubber prepared from only butadiene rubber particles. It is also seen that the impact resistance is excellent even in the case of changing the ratio of a silicone rubber and a butadiene rubber in the coagglomerated rubber.

EXAMPLES 9 AND 10 AND COMPARATIVE EXAMPLES 7 AND 8

As Examples 9 and 10, latexes of graft copolymer particles (IX) and (X) containing coagglomerated rubber were prepared using the coagglomerated rubber in Example 1 and the components shown in Table 7. The additional components were added dropwise over 4 hours in nitrogen stream

TABLE 7

| Components | Ex. 9 | Ex. 10 | Comp. Ex. 7 | Comp. Ex. 8 |
|---|---|---|---|---|
| Amounts of initially charged components (parts) | | | | |
| Pure water | 280 | 280 | 280 | 280 |
| Coagglomerated rubber prepared in Ex. 1 (solid) | 70 | 50 | — | — |
| Composite rubber of a Silicone rubber and an acrylic rubber prepared in Comp. Ex. 3 (solid) | — | — | 70 | 50 |
| Sodium oleate | 1 | 1 | 1 | 1 |
| SFS | 0.2 | 0.2 | 0.2 | 0.2 |
| EDTA | 0.01 | 0.01 | 0.01 | 0.01 |
| Ferrous sulfate | 0.0025 | 0.0025 | 0.0025 | 0.0025 |
| Additional components (parts) | | | | |
| ST | 21 | 35 | 21 | 35 |
| AN | 9 | 15 | 9 | 15 |
| t-DM | — | 0.2 | — | 0.2 |
| CHP | 0.3 | 0.1 | 0.3 | 0.1 |
| Polymerization conversion (%) | 98 | 99 | 99 | 97 |
| Average particle diameter (nm) | 350 | 390 | 370 | 410 |
| Abbreviation | IX | X | VI' | VII' |

The obtained latexes and the latexes of aromatic vinyl resins (T-2) and (T-3) obtained in Preparation Examples 9 and 10 were mixed in the combination shown in Table 8, respectively, so that the amount of rubber was 20%. And then the resulting latex was coagulated by adding 2 parts of calcium chloride to obtain a slurry. The obtained slurry was dehydrated and dried to obtain a powder of thermoplastic resin composition.

Subsequently, to 100 parts of the obtained powder of thermoplastic resin composition were added 0.2 part of a phenolic stabilizer (AO-20, available from Asahi Denka Kogyo KABUSIKI KAISHA) and 0.5 part of ethylenebi-sstearylamide. The mixture was melt-kneaded in a single-screw extruder (HW-40-28, made by Tabata Kikai KABUSIKI KAISHA) to prepare pellets. Molded plates were prepared using the pellets by means of FAS 100B injection molding machine (made by FANUC LTD.) at a cylinder temperature of 260° C.

Evaluation of falling weight impact strength and thermal resistance (HDT) was carried out. And processability in injection molding was evaluated using the pellets. The results are shown in Table 8.

TABLE 8

| Ex. No. | Graft Copolymer Particle | Aromatic Vinyl resin | Falling weight impact strength at 23° C. (kg · m) | HDT (° C.) | Process-Ability in injection molding (mm) |
|---|---|---|---|---|---|
| 9 | IX | T-2 | 4.4 | 115 | 480 |
| 10 | X | T-3 | 4.1 | 115 | 580 |
| Comp. Ex. No. | | | | | |
| 7 | VI' | T-2 | 4.1 | 115 | 440 |
| 8 | VII' | T-3 | 3.9 | 114 | 550 |

As is clear from Table 8, it is seem that the thermoplastic resin composition of the present invention not only is excellent in impact resistance and processability, but also has thermal resistance in good balance.

EXAMPLE 11

(1) Preparation of graft copolymer particles (XI) containing coagglomerated rubber A five-necked flask equipped with a stirrer, a reflux condenser, a nitrogen feeding port, a monomer feeding port and a thermometer was charged at one time with 220 parts of pure water, 80 parts (solid) of the coagglomerated rubber obtained in Example 1, 0.2 part of sodium rhodinate, 0.2 part of SFS, 0.01 part of EDTA and 0.0025 part of ferrous sulfate.

Subsequently, the system was heated up to 45° C. in nitrogen stream with stirring. After reaching 45° C., a mixture comprising 20 parts of methyl methacrylate (MMA) and 0.08 part of t-butylhydroperoxide (t-BH) was continuously added dropwise over 2 hours. After addition, stirring was continued at 45° C. for 1 hour to finish the polymerization. Thus a latex of graft copolymer particles (XI) containing the coagglomerated rubber was obtained. The polymerization conversion was 97%. The obtained latex had a concentration of solid component of 31%, an average particle diameter of 330 nm and a gel content of 93%.

The obtained latex was coagulated by adding 2 parts of calcium chloride, and then the coagulated slurry was dehydrated and dried to obtain a powder of graft copolymer particles (XI) containing the coagglomerated rubber.

(2) Preparation of a vinyl chloride resin composition and evaluation of physical properties thereof A mixture comprising 100 parts of vinyl chloride resin, 10 parts of the graft copolymer particles (XI), 2.5 parts of a tin stabilizer, 0.5 part of a lubricant, 3.0 parts of a filler and 2 parts of a polymer processing aid was kneaded for 5 minutes by means of mixing rolls at 180° C., and then test specimens were prepared by compression molding at 190° C. for 15 minutes. There were used as vinyl chloride resin KANEVINYL S1008 available from KANEKA CORPORATION, as a tin stabilizer N-2000E available from Nitto Kasei Co., Ltd., as a lubricant Hoechst-Wachs E available from Hoechst, as a filler R-650 available from Sakai Chemical Industry Co., Ltd. and as a polymer processing aid KANE ACE PA-20 available from KAKEKA CORPORATION. An Izod impact strength was measured at 23° C. and 0° C. using the obtained test specimens. The same measurement was carried out using test specimens exposed for 1000 hours in a sunshine weatherometer. Color tone of the test specimen immediately after molding (initial color tone) and thermal discoloration were also evaluated. The results are shown in Table 9.

COMPARATIVE EXAMPLE 9

A powder of graft copolymer particles (VIII') was prepared by graft polymerization in the same manner as in Example 11 except using the composite rubber of a silicone rubber and an acrylic rubber obtained in Comparative Example 3. On the other hand, vinyl chloride resin composition was prepared in the same manner as in Example 11 (2) except using the powder of graft copolymer particles (VIII') instead of the powder of graft copolymer particles (XI), and test specimens were prepared therefrom.

Using the obtained test specimens, an Izod impact strength, initial color tone and thermal discoloration were evaluated in the same manner as in Example 11. The results are shown in Table 9.

The initial color tone shown in Table 9 was evaluated by color difference based on a color tone of test specimen for Izod impact strength prepared with the composition in Example 11(2) except for graft copolymer particles (XI).

TABLE 9

| | Izod impact strength (kg · cm/cm) | | | Initial color tone | Thermal discoloration |
|---|---|---|---|---|---|
| | Immediately after molding | | After exposing | | |
| | 23° C. | 0° C. | 23° C. | (ΔE) | (ΔE) |
| Ex. No. 11 | 122 | 11 | 112 | 3 | 23 |
| Comp. Ex. No. 9 | 115 | 9 | 104 | 6 | 35 |

From the results of Table 9, it is seen that when the graft copolymer particles of the present invention containing coagglomerated rubber are used as an impact resistance modifier for vinyl chloride resin, the vinyl chloride resin composition are excellent in impact resistance, weather resistance, initial color tone and thermal discoloration resistance, compared with the composition containing graft copolymer particles containing a composite rubber of a silicone rubber and an acrylic rubber.

EXAMPLES 12 TO 14 AND COMPARATIVE EXAMPLES 10 TO 12

As Examples 12 to 14 and comparative Examples 10 to 12, test specimens were prepared in the same manner as in Example 11 with changing the amounts of graft copolymer particles in vinyl chloride resin composition in Example 11 and Comparative Example 9 to those shown in Table 10, respectively. And an Izod impact strength was measured in the same manner as in Example 11. The results are shown in Table 10.

TABLE 10

| Ex. No. | Graft copolymer Particles | | Izod impact strength (kg · cm/cm) | |
|---|---|---|---|---|
| | Kind | Amount (parts) | 23° C. | 0° C. |
| 12 | XI | 5 | 10 | 5 |
| 13 | XI | 7 | 15 | 7 |
| 14 | XI | 15 | 178 | 98 |
| Comp. Ex. No. | | | | |
| 10 | VIII' | 5 | 9 | 4 |
| 11 | VIII' | 7 | 12 | 6 |
| 12 | VIII' | 15 | 167 | 92 |

From the results of Table 10, it is seen that the composition containing coagglomerated rubber of the present invention are excellent in impact resistance even in the case of changing the ratio of the graft copolymer particles added to vinyl chloride resin, compared with the composition containing graft copolymer particles of a composite rubber of a silicone rubber and an acrylic rubber prepared by a conventional method.

EXAMPLES 15 TO 18

(1) Preparation of graft copolymer particles (XII) to (XV) containing coagglomerated rubber prepared from a mixed latex of a silicone rubber latex and an acrylic rubber latex.

As Examples 15 to 18, coagglomerated rubbers were prepared in the same manner as in Example 1 except changing the kind and amount of a silicone rubber latex and an acrylic rubber latex in Example 1 to those shown in Table 10. Each powder of graft copolymer particles (XII) to (XV) were prepared using the obtained coagglomerated rubber in the same manner as in Example 11. Table 11 shows the average particle diameter of the obtained coagglomerated rubber particles and the obtained graft copolymer particles, and polymerization conversion of graft polymerization.

COMPARATIVE EXAMPLE 13

An agglomerated rubber (average particle diameter: 320 nm) comprising only acrylic rubber particles was prepared in the same manner as in Example 15 except using the acrylic rubber latex (B-1) prepared in Preparation Example 7 instead of the silicone rubber latex (A-2) in Example 15. A powder of graft copolymer particles (IX') was prepared using the obtained agglomerated rubber in the same manner as in Example 15. Test specimens were prepared in the same combination and method as in Example 11 except using the powder of the graft copolymer particles (IX') instead of the powder of the graft copolymer particles (X). And an Izod impact strength was measured. The results are shown in Table 12.

TABLE 12

| Ex. No. | Graft copolymer particles | Izod impact strength (kg · cm/cm) | |
|---|---|---|---|
| | | 23° C. | 0° C. |
| 15 | XII | 115 | 10 |
| 16 | XIII | 135 | 12 |
| 17 | XIV | 125 | 12 |
| 18 | XV | 120 | 14 |
| Comp. Ex. No. 13 | IX' | 35 | 6 |

From the results shown in Table 12, it is seen that high impact resistance is given even in the case of changing the ratio of a silicone rubber in a coagglomerated rubber contained in graph copolymer particles. It is also seen that high impact resistance cannot be given even using an agglomerated rubber containing only an acrylic rubber particles.

EXAMPLE 19 AND COMPARATIVE EXAMPLE 14

An example 19, a powder of graft copolymer particles (XVI) containing a coagglomerated rubber was prepared

TABLE 11

| | Silicone rubber latex | | Acrylic rubber latex | | Average particle diameter of | Graft polymerization | Average particle diameter of | Concentration of | |
|---|---|---|---|---|---|---|---|---|---|
| | Kind | Parts (solid) | Kind | Parts (solid) | (co)agglomerated rubber (nm) | conversion (%) | graft copolymer (nm) | solid component (%) | Abbreviation |
| Ex. No. | | | | | | | | | |
| 15 | (A-2) | 8 | (B-1) | 92 | 330 | 99 | 360 | 29 | XII |
| 16 | (A-1) | 12 | (B-1) | 88 | 320 | 99 | 340 | 29 | XIII |
| 17 | (A-3) | 25 | (B-1) | 75 | 310 | 99 | 340 | 29 | XIV |
| 18 | (A-3) | 50 | (B-1) | 50 | 260 | 99 | 280 | 29 | XV |
| Com. Ex. No. | | | | | | | | | |
| 13 | — | — | (B-1) | 100 | 320 | 99 | 340 | 29 | IX' |

(2) Preparation of vinyl chloride resin composition and evaluation of physical properties thereof Vinyl chloride resin compositions were prepared in the same manner as in Example 11 except using powders of the graft copolymer particles from (XII) to (XV) containing coagglomerated rubber instead of powder of the graft copolymer particles (XI) containing coagglomerated rubber in Example 11 and test specimens were prepared in the same manner as in Example 11. Then an Izod impact strength was measured. The results are shown in Table 12.

using the coagglomaerated rubber obtained in Example 1 and the following components. The polymerization temperature was 60° C., and the additional components were added dropwise over 3 hours in nitrogen stream. After addition, stirring was continued for one hour to finish the polymerization. The powder was recovered from the latex in the same manner as in Example 11. The polymerization conversion was 98% and the average particle diameter was 370 nm.

| Initially charged components | |
| --- | --- |
| Pure water | 240 parts |
| Coagglomerated rubber obtained in Example 1 (solid) | 60 parts |
| Sodium oleate | 0.5 part |
| SFS | 0.2 part |
| EDTA | 0.01 part |
| Ferrous sulfate | 0.0025 part |
| Additional components | |
| ST | 27 parts |
| AN | 11 parts |
| Methacrylic acid | 2 parts |
| t-DM | 0.4 part |
| CHP | 0.1 part |

As Comparative Example 14, a powder of graft copolymer particles (X') was prepared in the same manner as mentioned above except using the composite rubber of a silicone rubber and an acrylic rubber obtained in Comparative Example 3.

The obtained powder of graft copolymer particles was mixed in an amount shown in Table 13 based on 100 parts of the thermoplastic resin shown in Table 13, and to the mixture were added 0. 2 part of a phenolic stabilizer (AO-20, available from Asahi Denka Kogyo KABUSIKI KAISHA) and 0.5 part of ethylenebisstearylamide. The mixture was melt-kneaded in a single-screw extruder (HW-40-28, made by Tabata Kikai KABUSIKI KAISHA) to prepare pellets. Test specimens for Izod impact strength were prepared using the pellets by means of FAS100B injection molding machine (made by FANUC LTD.) at a cylinder temperature of 260° C. Then an Izod impact strength was evaluated. The results are shown in Table 13.

EXAMPLES 20 AND 21 AND COMPARATIVE EXAMPLES 15 AND 16

As Examples 20 and 21 using the powder of graft copolymer articles (XI) obtained in Example 11, and as Comparative Examples 15 and 16 corresponding to Examples 20 and 21, respectively, using the powder of graft copolymer particles (VIII') obtained in Comparative Example 9, test specimens were prepared in the same manner as in Example 19. Then an Izod impact strength was evaluated in the same manner as in Example 19. The results are shown in Table 13.

Abbreviations of thermoplastic resins shown in Table 13 mean the followings:

PA: polyamide
PBT: poly(butylene terephthalate)
PC: polycarbonate

TABLE 13

| | Graft copolymer particles | | Thermoplastic resin | Izod impact strength 23° C. |
| --- | --- | --- | --- | --- |
| | Kind | Amount (parts) | | (kg · cm/cm) |
| Ex. 19 | XVI | 30 | | 22 |
| Com. Ex. 14 | X' | 30 | PA | 18 |
| Ex. 20 | XI | 15 | | 20 |
| Com. Ex. 15 | VIII' | 15 | PBT | 18 |
| Ex. 21 | XI | 5 | | 80 |
| Com. Ex. 16 | VIII' | 5 | PC | 76 |

From the results shown in Table 13, it is seen that when the graft copolymer particles containing coagglomerated rubber of the present invention are employed as an impact resistance modifier for an engineering thermoplastic resin (Examples 19 to 21), high effect of improving impact resistance is given compared with the case of using graft copolymer particles containing a composite rubber of a silicone rubber and an acrylic rubber obtained by a conventional method (Comparative Examples 14 to 16).

INDUSTRIAL APPLICABILITY

According to the present invention, there can be obtained graft copolymer particles as a modifier of thermoplastic resin, using a coagglomerated rubber prepared by coagglomerating a silicone rubber latex and an acrylic rubber latex and/or a conjugated diene rubber latex. A thermoplastic resin composition comprising the graft copolymer particles and a thermoplastic resin is excellent in impact resistance, weather resistance, processability, thermal discoloration resistance and appearance of molded products.

What is claimed is:

1. Graft copolymer particles prepared by graft-polymerizing a vinyl monomer to a coagglomerated rubber, wherein said rubber is prepared by coagglomerating rubber particles of a mixed latex obtained by mixing (A) a silicone rubber latex with (B) at least one latex selected from the group consisting of an acrylic rubber latex and a conjugated diene rubber latex in such an amount that a silicone content is from 1 to 90% by weight based on the total rubber component.

2. The graft copolymer particles of claim 1, wherein said coagglomerated rubber is prepared by adding from 0.1 to 15 parts by weight of a latex of a copolymer having an acid functional group (solid basis) to 100 parts by weight of said mixed latex (solid basis), thereby coagglomerating said mixed latex, in which said latex of a copolymer having an acid functional group is prepared by copolymerizing from 1 to 30% by weight of an unsaturated acid monomer, from 35 to 99% by weight of a (meth)acrylate monomer and from 0 to 35% by weight of another monomer copolymerizable thereto.

3. The graft copolymer particles of claim 1, wherein said silicone rubber latex (A) is at least one rubber latex selected from the group consisting of a silicone rubber latex and a latex of a composite rubber comprising a silicone rubber and an acrylic rubber.

4. The graft copolymer particles of claim 1, 2 or 3, wherein said vinyl monomer is at least one monomer selected from the group consisting of an aromatic vinyl monomer, a vinyl cyanide monomer, a vinyl halide monomer, a (meth)acrylic acid monomer and a (meth)acrylate monomer.

5. A thermoplastic resin composition comprising 1 to 150 parts by weight of said graft copolymer particles of claim 1, 2 or 3 and 100 parts by weight of a thermoplastic resin.

6. The thermoplastic resin composition of claim 5, wherein said thermoplastic resin is at least one resin selected from the group consisting of poly(vinyl chloride), polystyrene, styrene-acrylonitrile copolymer, styrene-acrylonitrile-N-phenylmaleimide copolymer, α-methylstyrene-acrylonitrile copolymer, poly(methyl methacrylate), methyl methacrylate-styrene copolymer, polycarbonate, polyamide, polyester, ABS resin, AAS resin, AES resin and poly(phenylene ether)-polystyrene composite resin.

7. A thermoplastic resin composition comprising 1 to 150 parts by weight of said graft copolymer particles of claim 4 and 100 parts by weight of a thermoplastic resin.

8. The thermoplastic resin composition of claim 7, wherein said thermoplastic resin is at least one resin selected from the group consisting of poly(vinyl chloride), polystyrene, styrene-acrylonitrile copolymer, styrene-acrylonitrile-N-phenylmaleimide copolymer, α-methylstyrene-acrylonitrile copolymer, poly(methyl methacrylate), methyl methacrylate-styrene copolymer, polycarbonate, polyamide, polyester, ABS resin, AAS resin, AES resin and poly(phenylene ether)-polystyrene composite resin.

* * * * *